United States Patent
Yoo et al.

(10) Patent No.: US 6,765,857 B2
(45) Date of Patent: Jul. 20, 2004

(54) OPTICAL RECORDING AND PICKUP HEAD FOR DIGITAL VERSATILE DISC COMPATIBLE WITH READ-WRITABLE COMPACT DISC BY ADOPTING FLAT PLATE LENS HAVING STAIRCASE TYPE DIFFRACTION GRATING STRUCTURE

(75) Inventors: Jang-Hoon Yoo, Seoul (KR);
Chul-Woo Lee, Kyungki-do (KR);
Kun-Ho Cho, Kyungki-do (KR);
Pyong-Yong Seong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/178,528

(22) Filed: Jun. 25, 2002

(65) Prior Publication Data

US 2003/0021215 A1 Jan. 30, 2003

Related U.S. Application Data

(63) Continuation of application No. 09/425,673, filed on Oct. 22, 1999, now Pat. No. 6,449,237, which is a continuation-in-part of application No. 08/921,386, filed on Aug. 29, 1997, now Pat. No. 6,222,812.

(60) Provisional application No. 60/025,100, filed on Sep. 3, 1996.

(30) Foreign Application Priority Data

Oct. 23, 1998 (KR) ............................................. 98-44620
Oct. 26, 1998 (KR) ............................................. 98-44858

(51) Int. Cl.$^7$ .................................................. G11B 7/00

(52) U.S. Cl. ................................. 369/112.06; 369/121

(58) Field of Search .......................... 369/44.23, 44.24, 369/44.37, 112.03, 112.05, 112.06, 112.08, 112.1, 112.13, 112.23, 112.25, 121

(56) References Cited

U.S. PATENT DOCUMENTS

| | | | |
|---|---|---|---|
| 5,809,000 A | 9/1998 | Choi | |
| 5,838,496 A | 11/1998 | Maruyama et al. | |
| 6,181,668 B1 | 1/2001 | Kajiyama et al. | |
| 6,222,812 B1 * | 4/2001 | Yoo et al. ............... | 369/112.16 |

FOREIGN PATENT DOCUMENTS

| | | |
|---|---|---|
| EP | 0747893 A2 | 12/1996 |
| EP | 0859356 A2 | 8/1998 |
| EP | 0831469 A2 | 9/1998 |
| EP | 0932145 A1 | 7/1999 |
| EP | 0936604 | 8/1999 |
| EP | 0936604 A1 | 8/1999 |
| WO | 98/13826 | 4/1998 |
| WO | 98/19303 | 5/1998 |

\* cited by examiner

*Primary Examiner*—Paul W. Huber
(74) *Attorney, Agent, or Firm*—Burns, Doane, Swecker & Mathis, L.L.P.

(57) ABSTRACT

An optical recording and pickup head having a flat plate lens of a staircase type diffraction grating structure is compatible with a DVD and a CD-RW. The optical recording and pickup head includes a first optical source for emitting first light having a relatively short wavelength, a second optical source for emitting second light having a relatively long wavelength, a photo detector, an objective lens for focusing the light emitted from the first and second optical sources on the information recording surfaces of the optical discs, respectively, an optical path altering unit for transferring the light emitted from the first and second optical sources to the objective lens and transferring the first and second light reflected from the information recording surfaces of the plurality of discs to the photo detector, respectively, and a flat plate lens for substantially totally transmitting the first light proceeding from the optical path altering unit to the objective lens and diffracting the second light proceeding from the optical path altering unit to the optical axis of the objective lens.

22 Claims, 7 Drawing Sheets

őoptical recording and pickup head
OPTICAL RECORDING AND PICKUP HEAD FOR DIGITAL VERSATILE DISC COMPATIBLE WITH READ-WRITABLE COMPACT DISC BY ADOPTING FLAT PLATE LENS HAVING STAIRCASE TYPE DIFFRACTION GRATING STRUCTURE This application is a continuation of application Ser. No. 09/425,673, filed on Oct. 22, 1999, (now U.S. Pat. No. 6,449,237), which is a continuation-in-part of application Ser. No. 08/921,386, filed on Aug. 29, 1997 (now U.S. Pat. No. 6,222,812), application Ser. No. 08/921,386 claims priority from Provisional Application No. 60/025,100, filed on Sep. 3, 1996.

BACKGROUND OF THE INVENTION

1. Field of the Invention

The present invention relates to an optical recording and pickup head for at least two optical discs in which recording and reproduction of information is performed by light of a respectively different wavelengths, and more particularly, to an optical recording and pickup head for recording information on a digital versatile disc (DVD) or a read-writeable compact disc (CD-RW) and reproducing information therefrom.

2. Description of the Invention

Optical discs are widely used as recording media for storing a large volume information. Among them, CDs and DVDs are widely being used. There are recordable CDs (CD-R) and read-writeable CD's (CD-RW) as recent new CD types. As is well known, in case of DVDs, recording and reproduction of information is performed by laser light of 790 nm. Accordingly, an optical recording and pickup head which is compatible with both a DVD and a CD-RW includes two optical sources for emitting laser light of a respectively different wavelength, and an optical system for the two kinds of light.

Referring to FIGS. 1 and 2, a conventional optical recording and pickup head which is compatible with both a DVD and a CD-R will be described below.

FIG. 1 shows a configuration of a conventional optical recording and pickup head which is compatible with both a DVD and a CD-R. The optical recording and pickup head includes an optical source 1 emits first light of 660 nm in order to perform recording and reproduction of information with respect to a DVD 8, an optical source 11 emits second light of 790 nm in order to perform recording and reproduction of information with respect to a CD-R 9, and an objective lens 7 for focusing the first and second light emitted from the optical sources 1 and 11 on information recording surfaces of the DVD 8 and CD-R 9, respectively. A collimating lens 2 collimates the first light emitted from the optical source 1 into parallel light and transfers the collimated light to a beam splitter 3. The beam splitter 3 reflects the first light incident from the collimating lens 2 onto an interference filter prism 4. The interference filter prism 4 transfers the first light which is the parallel light incident from the beam splitter 3 to a quarter-wave plate 5. In more detail, the interference filter prism 4 is an optical device for total transmitting and total reflecting incident light according to its wavelength, in which the first light of 660 nm is totally transmitted and the second light of 790 nm incident from a converging lens 14 is totally reflected. A thin-film type variable aperture 6 transfers the first light incident from the quarter-wave plate 5 to the objective lens 7. The objective lens 7 focuses the parallel incident first light on the information recording surface of the DVD 8 whose thickness is 0.6 mm. As a result, the first light which is focused on and reflected from the information recording surface of the DVD 8 contains the information recorded on the focused position. The first light reflected from the information recording surface of DVD 8 transmits the objective lens 7, the variable aperture 6 and the quarter-wave plate 5, in turn and then incident to the interference filter prism 4. The interference filter prism 4 transfers the first light incident from the quarter-wave plate 5 to the beam splitter 3. The beam splitter 3 transfers the first light incident from the interference filter prism 4 to a photo detector 10. The photo detector 10 detects information from the first light incident from the beam splitter 3.

The second light of 790 nm emitted from the optical source 11 passes through a collimating lens 12 and a beam splitter 13 and then incident onto a converging lens 14. The converging lens 14 transfers the second light incident from the beam splitter 13 to the interference filter prism 4 in convergence light form. The interference filter prism 4 transfers the second light incident from the converging lens 14 to the quarter-wave plate 5 in divergence light form. The quarter-wave plate 5 transfers the second light incident from the interference filter prism 4 to the variable aperture 6. The variable aperture 6 transmits only a part of the second light incident from the quarter-wave plate 5 and transfers the transmitted second light to the objective lens 7 in divergence light form. The reason why the second light is incident to the objective lens 7 in diverging form is for focusing the second light on the information recording surface of the CD-R 9 without causing generation of spherical aberration.

FIG. 2 is a view for explaining the thin-film type variable aperture 6 of FIG. 1. The thin-film type variable aperture 6 has a structure of selectively transmitting the light incident to areas whose numerical aperture (NA) is less than or equal to 0.6. An region 1 is a region whose numerical aperture is less than or equal to 0.45, in which incident light of 790 nm and 660 nm is totally transmitted. An region 2 is a region whose numerical aperture ranges from 0.45 to 0.6, in which a dielectric thin film is coated and the light of 660 nm wavelength is totally transmitted and the light of 790 nm wavelength is totally reflected. The region 1 is made of a quartz ($SiO_2$) thin-film in order to remove an optical aberration generated by the region 2 where the dielectric thin-film is coated. The variable aperture 6 having the transmission characteristic totally transmits the first light of 660 nm wavelength irrespective of the region and totally transmits the second light of 790 nm wavelength which is incident into the region 1 whose numerical aperture is less than 0.45 to be transferred to the objective lens 7, and totally reflects the second light which is incident into the region 2 whose numerical aperture is more than or equal to 0.45. Thus, the numerical aperture with respect to the light incident to the objective lens 7 is limited according to its wavelength.

The objective lens 7 focuses the second light incident from the thin-film type variable aperture 6 on the information recording surface of the CD-R 9 whose thickness is 1.2 mm, thereby forming an optical spot. The second light reflected from the information recording surface of the CD-R 9 passes the objective lens 7, the variable aperture 6 and the quarter-wave plate 5, in turn and then incident to the interference filter prism 4. The interference filter prism 4 reflects the second light incident from the quarter-wave plate 5 to a converging lens 14. The converging lens 14 transfers the second light to a beam splitter 13. The beam splitter 13 transfers the second light incident from the converging lens 14 to a photo detecter 15. The photo detector 15 receives the second light from the beam splitter 13 and detects information from the received second light. Thus, the optical recording and pickup head of FIG. 1 can perform recording and reproduction of information with respect to both the DVD 8 and the CD-R 9.

However, the optical recording and pickup head of FIG. 1 should include a particular variable aperture 6 in order to selectively limit the numerical aperture with respect to the light incident to the objective lens 7 according to the wavelength of the incident light. Since a quartz thin film is coated on the region 1 of the variable aperture 6 and a multilayer dielectric thin film having the thickness of micrometer unit is configured on the region 2 thereof, the manufacturing process is complicated and the production cost becomes high. Also, since the second light for use in a CD-R which is incident to the region whose numerical aperture is more than or equal to 0.45 is totally reflected, it is not appropriate for adapting itself to an optical system of an optical recording and pickup head for use in a CD-RW requiring a larger numerical aperture of about 0.5 or more and a higher optical efficient for recording.

SUMMARY OF THE INVENTION

To solve the above problems, it is an object of the present invention to provide an optical recording and pickup head for use in both a DVD and a CD-RW, including a flat plate lens for totally transmitting incident light according to its wavelength and diffracting the same toward an optical axis of an objective lens.

To accomplish the object of the present invention, there is provided an optical recording and pickup head for a plurality of optical discs for performing recording and reproduction of information with respectively different wavelengths, the optical recording and pickup head comprising: a first optical source for emitting first light having a relatively short wavelength; a second optical source for emitting second light having a relatively long wavelength; a photo detector; an objective lens for focusing the light emitted from the first and second optical sources on the information recording surfaces of the optical discs, respectively; an optical path altering unit for transferring the light emitted from the first and second optical sources to the objective lens and transferring the first and second light reflected form the information recording surfaces of the plurality of discs to the photo detector, respectively; and a flat plate lens for substantially totally transmitting the first light proceeding from the optical path altering unit to the objective lens and diffracting the second light proceeding from the optical path altering unit to the optical axis of the objective lens.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE PREFERRED EMBODIMENTS

Preferred embodiments of the present invention will be described with reference to the accompanying drawings.

Figure 3:
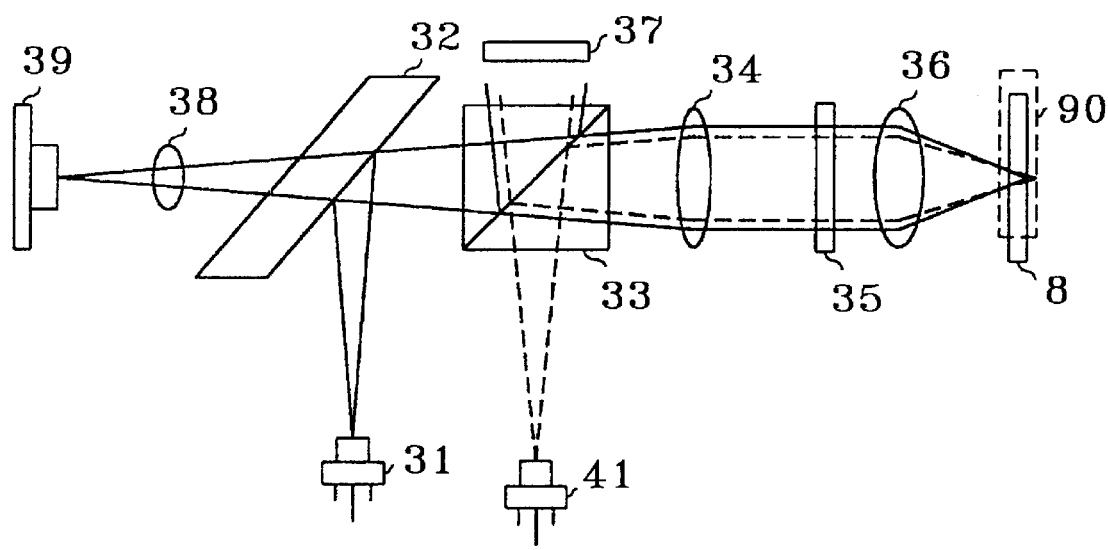
FIG. 3 shows a schematic view of an optical recording and pickup head capable of performing recording and reproduction of information onto a DVD and a CD-RW according to a first embodiment of the present invention.

Referring to FIG. 3 showing an optical recording and pickup head capable of performing recording and reproduction of information onto a DVD and a CD-RW according to a first embodiment of the present invention, an optical recording and pickup head includes a first optical source 31 for emitting first light of a 660 nm wavelength, a second optical source 41 for emitting second light of a 790 nm wavelength, a photo detector 39 for detecting information from the first and second light reflected from the optical discs 8 and 90, an objective lens 36 for focusing the first and second light on the information recording surfaces of the corresponding optical discs 8 and 90, respectively, and optical elements 32, 33, 34 and 38 and a staircase type flat plate lens 35 for transferring the light emitted from the first and second optical sources 31 and 41 to the objective lens 36 and transferring the first and second light reflected from the information recording surfaces of the plurality of discs 8 and 90 to the photo detector 39, respectively.

The first optical source 31 emits the first light of 660 nm wavelength in order to perform recording and reproduction of information with respect to the DVD 8. A reflective flat plate 32 transfers the first light incident from the first optical source 31 to a beam splitter 33. The beam splitter 33 transmits most of the first light incident from the reflective flat plate 32 and then transfers the same to a first collimating lens 34, while the beam splitter 33 reflects a part of the remaining first light incident from the reflective flat plate 32 and then transfers the same to a photo quantity detector 37. The photo quantity detector 37 detects the photo quantity of the first light incident from the reflective flat plate 32. The collimating lens 34 collimates the first light incident from the beam splitter 33 into parallel light and transfers the same to a staircase type flat plate lens 35. The staircase type flat plate lens 35 substantially totally transmits the first light which is the parallel light incident from the collimating lens 34 without causing any distortion and diffraction and transfers the result to the objective lens 36. The objective lens 36 has a predetermined focal distance in order to form the first light incident from the staircase type flat plate lens 35 as an optical spot of about 0.9 $\mu$m on the information recording surface of the DVD 8. As a result, the first light contains information which is recorded on the position focused on the information recording surface of the DVD 8. The light reflected from the DVD 8 transmits the objective lens 36, the staircase type flat plate lens 35 and the collimating lens 34, in turn, to then be transferred to the beam splitter 33. The beam splitter 33 transfers the first light to a light receiving lens 38. The light receiving lens 38 transfers the first light incident from the beam splitter 33 to the photo detector 39 so that the first light is received at the photo detector 39 in convergence form. The photo detector 39 detects information from the light incident from the light receiving lens 38.

The second optical source 41 emits the second light of 790 nm wavelength to the beam splitter 33, in order to perform recording and reproduction of information with respect to the CD-RW 90. The beam splitter 33 has an optical characteristic of reflecting the light of 790 nm incident from the second optical source 41, and transmits most of the second light incident from the second optical source 41 to then be transferred to the collimating lens 34, while the beam splitter 33 reflects a part of the remaining second light to the photo quantity detector 37. The photo quantity detector 37 detects the photo quantity of the second light incident from the beam splitter 33. The collimating lens 34 collimates the second light incident from the beam splitter 33 into parallel light, to then be transferred to the staircase type flat plate lens 35. Referring to FIGS. 4 through 7, the staircase type flat plate lens 35 will be described in detail.

Figure 4:
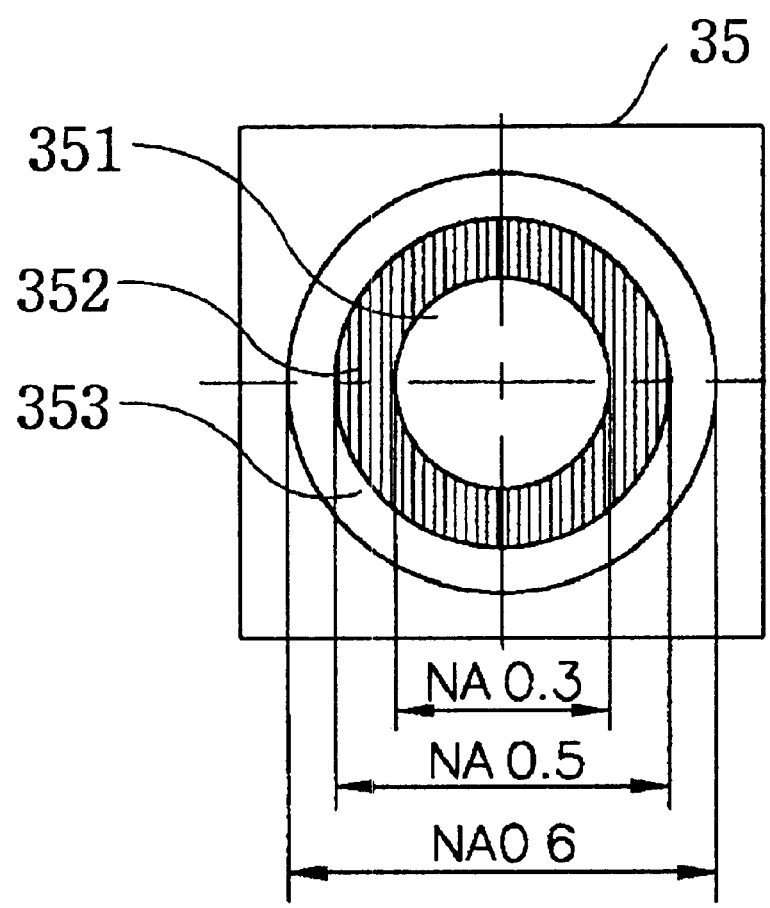
FIG. 4 shows a configuration of a staircase type flat plate lens.

FIG. 4 shows the structure of the staircase type flat plate lens 35. As shown, the staircase type flat plate lens 35 includes first area through third areas 351 through 353. The first area 351 is an area whose numerical aperture is less than or equal to 0.3, the second area 352 is an area whose numerical aperture is from 0.3 to 0.5, and the third area 353 is an area whose numerical aperture is less than or equal to 0.6. The second area 352 includes diffraction gratings each having a staircase type structure in radial direction. The first area 351 has an optical characteristic in which a zero-order diffraction efficiency is approximately 100% with respect to both light of 660 nm and 790 nm. The zero-order diffraction efficiency is defined as a value which has been indicated as a percentage of a photo quantity of the transmitted light with respect to the incident light quantity while maintaining a proceeding direction of the incident light. The second area 352 has an optical characteristic in which the zero-order diffraction efficiency is about 100% with respect to the light of 660 nm, the zero-order diffraction efficiency is about 0% and first-order diffraction efficiency is about 70% or more, with respect to the light of 790 nm. The first-order diffraction efficiency is defined as a value which has been indicated as a percentage of the photo quantity of the firstly diffracted light with respect to the incident photo quantity.

Referring back to FIG. 3 showing the optical recording and pickup head, the staircase type flat plate lens 35 totally transmits the first light of 660 nm and the second light of 790 nm which are incident to the first area from the collimating lens 34 without causing any diffraction, to then be transferred to the objective lens 36. Also, the first light of 660 nm which is incident to the second area from the collimating lens 34 is totally transmitted without causing any diffraction and the second light of 790 nm is diffracted as much as about 70% of the incident photo quantity by a first diffractive angle, to then be transferred to the objective lens 36.

Figure 5:
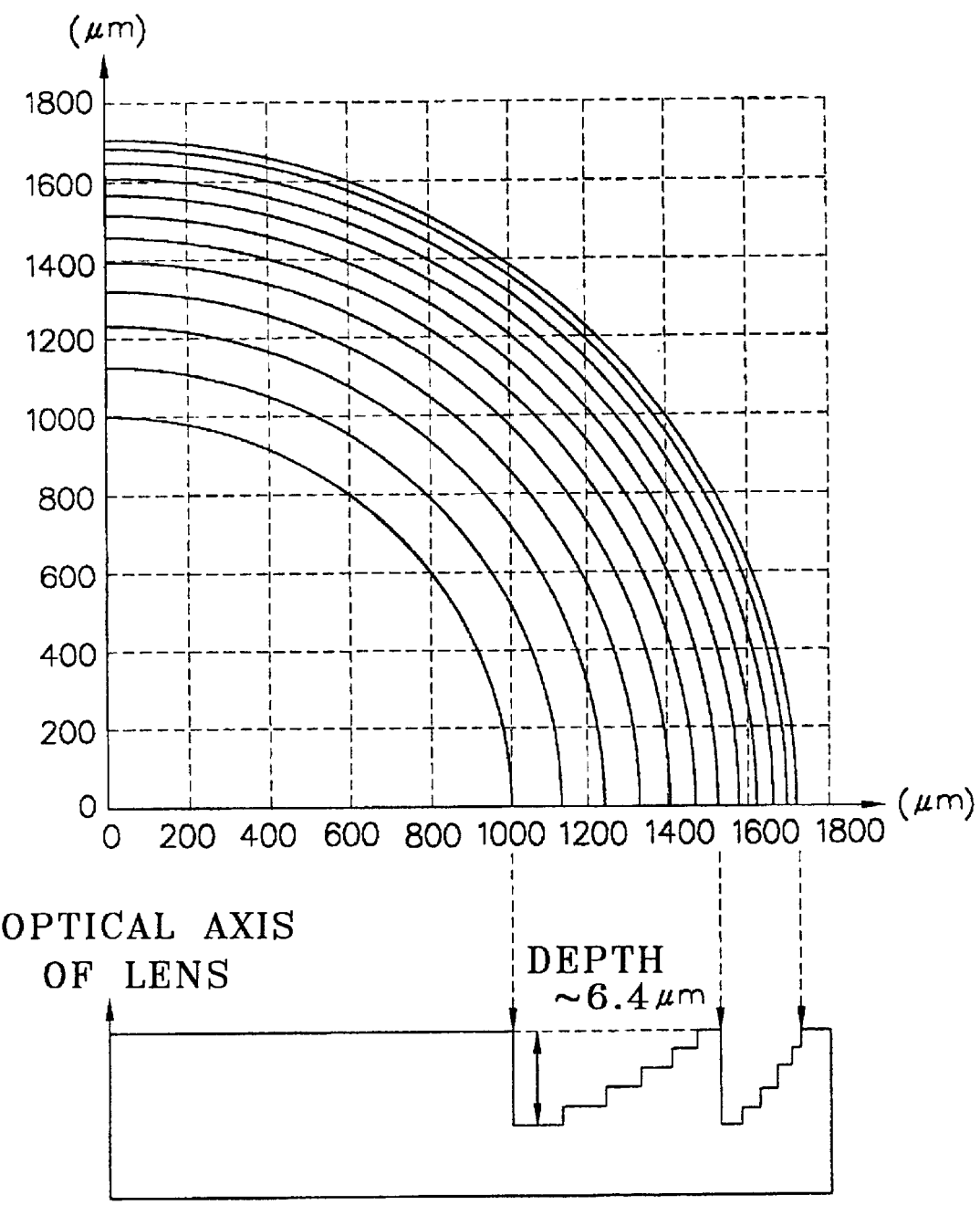
FIG. 5 shows the diffraction grating structure of the staircase type flat plate lens.

FIG. 5 shows the diffraction grating structure formed in the second area of the staircase type flat plate lens 35. In FIG. 5, the upper graphical view shows positions where the diffractive gratings are formed in radial direction on a light receiving plane of the staircase type flat plate lens 35. In the upper graphical view, the vertical and horizontal axis indicate the distances in radial direction from the optical center, where the unit is $\mu$m. The upper view shows a quarter of the staircase type flat plate lens 35 of FIG. 4. It can be seen that the whole staircase type flat plate lens 35 includes annular gratings. The lower view of FIG. 5 indicates the grating structure of the staircase type flat plate lens 35 viewed from the lateral surface perpendicular to the a light receiving plane, which shows positions and depths of the gratings. In the lower view, the left-hand vertical axis indicates the optical axis of the staircase type flat plate lens 35. As shown, the etched maximum depth is 6.4 $\mu$m in the staircase type flat plate lens 35. The staircase type flat plate lens 35 includes staircase type gratings each of which the depth becomes shallower and the width becomes narrower, as it is farther from the optical center of the light receiving plane. In the staircase type flat plate lens 35, the staircase type gratings are repeated. For example, in the lower view of FIG. 5, the staircase type gratings are formed in the positions each of which the radius is from 1000 $\mu$m to 1500 $\mu$m, and the staircase type gratings are also formed in the positions each of which the radius is from 1500 $\mu$m to 1700 $\mu$m, which shows that the staircase type gratings are repeated. The staircase type gratings are installed facing the collimating lens 34. Accordingly, a spherical aberration occurring when the second light is used can be removed.

Figure 6:
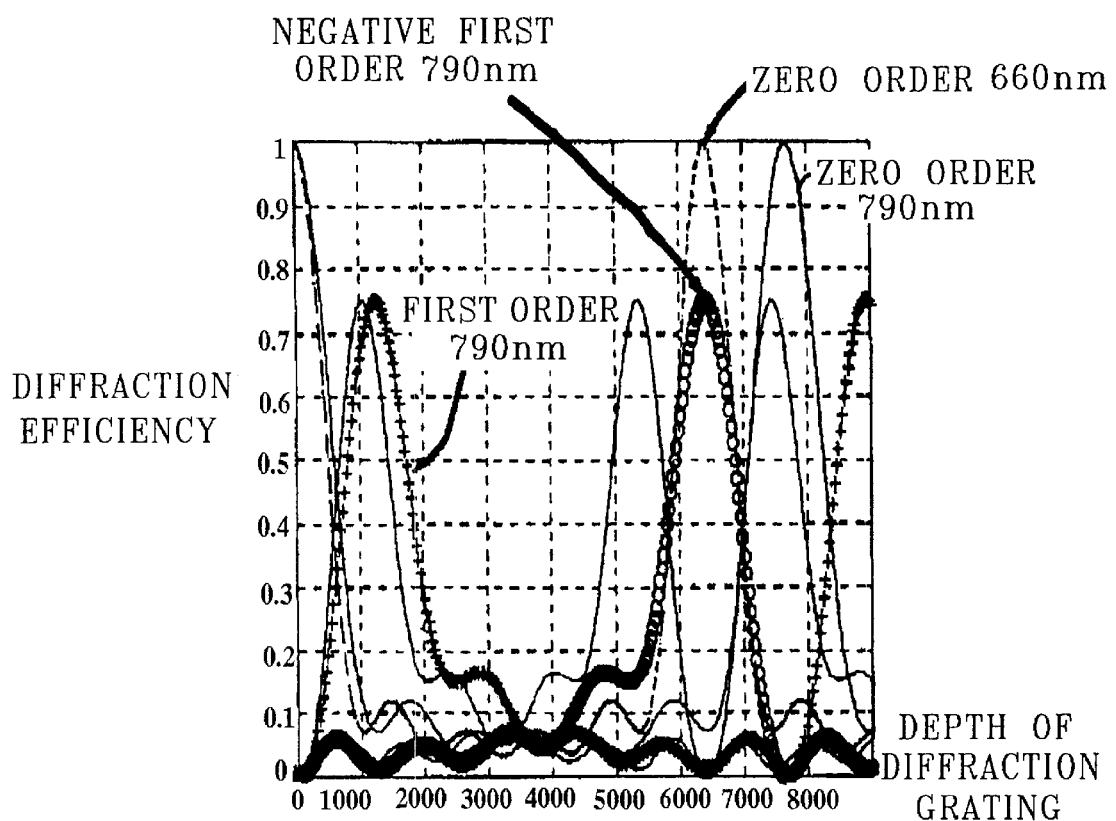
FIG. 6 is a graphical view showing diffraction efficiency characteristics of the staircase type flat plate lens according to the depths of the diffraction grating.

FIG. 6 is a graphical view showing diffraction efficiency characteristics of the staircase type flat plate lens 35 according to the depths of the diffraction gratings. In the graph, the horizontal axis indicates the depth of the diffraction grating in unit of nanometer (nm) and the vertical axis indicates the diffraction efficiency. In the graph, a dotted curve indicates a zero order diffraction efficiency value with respect to the light of 660 nm varying according to the depth of the grating. A curve composed of connection of small circles indicates a first order diffraction efficiency value with respect to the light of 790 nm. The characters and figures in the boxes indicate the diffraction order number considering the direction and the wavelength of the incident light, respectively. The diffraction order number which is negative (−) indicates that the light is diffracted toward the optical axis of the objective lens 36. Otherwise, the light is diffracted in the direction farther from the optical axis of the objective lens 36. As shown, when the depth of the staircase type flat plate lens 35 is 6400 nm, that is, 6.4 $\mu$m, the zero-order diffraction efficiency of the staircase type flat plate lens 35 with respect to the first light of 660 nm is one (1) and the negative (−) first order diffraction efficiency of the staircase type flat plate lens with respect to the second light of 790 nm is 0.75. Therefore, in the optical pickup of FIG. 3, the zero order diffraction efficiency with respect to the light of 660 nm is made close to 100% and the zero order diffraction efficiency does not occur with respect to the light of 790 nm. Also, in order to heighten at maximum the optical efficiency of the second light of the 790 nm which is used for performing recording and reproduction of information with respect to the CD-RW 90, the depth of the diffractive grating which is the deepest in the staircase type flat plate lens 35 is preferably about 6.4 $\mu$m.

Figure 7:
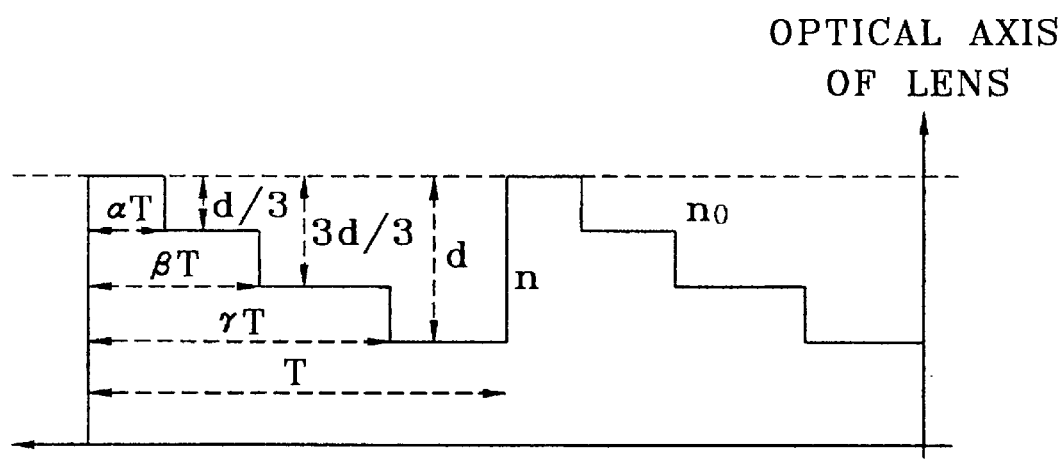
FIG. 7 is a view for explaining the relationship between the diffraction grating depth and the diffraction efficiency in the staircase type flat plate lens.

FIG. 7 is a view for explaining the relationship between the diffraction grating depth and the diffraction efficiency in the staircase type flat plate lens 35. In FIG. 7, the right-hand vertical axis indicates the optical axis of the staircase type flat plate lens 35, and the horizontal axis thereof indicates a radial direction on the light receiving plane. As shown, the T indicates one cycle of the staircase type diffraction gratings. In the staircase type flat plate lens 35 of FIG. 7, three diffraction gratings make one cycle T. In the drawing, $\alpha$, $\beta$ and $\gamma$ are coefficients which are larger than 0 and less than 1, in which the relationship of $\alpha < \beta < \gamma$ is established. Also, n denotes a refractive index of the staircase type flat plate lens 35, in which $n_0$ is the refractive index of air which is normally 1. Assuming that any one position in radial direction in the staircase type flat plate lens 35 is $\chi$, the staircase type flat plate lens 35 has a transmission efficiency coefficient Tm which satisfies the following equation (1).

$$T_m = \frac{1}{T}\int_0^T \exp\left(\frac{2\pi i m}{T}\chi\right)T(\chi)dx \tag{1}$$

Here, T denotes the width of the staircase type diffraction grating structure corresponding to one cycle, m denotes the diffraction order number, $\pi$ denotes the ratio of the circumference of a circle to its diameter, i denotes the imaginary unit, and $T(\chi)$ denotes the transmission efficiency coefficient at $\chi$. The optical efficiency is determined by squaring a complex number with the transmission efficiency coefficient.

In more detail, the first diffraction grating of the staircase type flat plate lens 35 which is located at interval of $\alpha T < \chi < \beta T$ has a transmission efficiency coefficient $T(\chi)$ which satisfies the following equation (2).

$$T(x) = \exp\left(\frac{2\pi i(n-n_0)d}{3\lambda}\right) \tag{2}$$

Here, n denotes a refractive index of the flat plate lens, $n_0$ denotes the refractive index of air, d denotes the maximum depth of the diffraction grating, 3 is the number of the diffraction gratings installed within one cycle of the diffraction grating structure, and $\lambda$ denotes the wavelength of the incident light. The optical efficiency is determined by squaring a complex number with the transmission efficiency coefficient.

The second diffraction grating of the staircase type flat plate lens 35 located at interval of $\beta T < \chi < \gamma T$ has the transmission efficiency coefficient $T(\chi)$ which satisfies the following equation (3).

$$T(x) = \exp\left(\frac{4\pi i(n-n_0)d}{3\lambda}\right) \tag{3}$$

The third diffraction grating of the staircase type flat plate lens 35 located at interval of $\gamma T < \chi < T$ has the transmission efficiency coefficient $T(\chi)$ which satisfies the following equation (4).

$$T(x) = \exp\left(\frac{6\pi i(n-n_0)d}{3\lambda}\right) \tag{4}$$

Also, the transmission efficiency coefficient of the 0-th diffraction grating of the staircase type flat plate lens 35 located at interval of $0 < \chi < \alpha T$ is $T(\chi)=1.0$.

Meanwhile, the staircase type flat plate lens 35 includes diffraction gratings of the number which satisfies the following equation (5) within one cycle of the diffraction grating structure.

$$N \approx \lambda_1/(\lambda_2-\lambda_1) \tag{5}$$

Here, N is an integer, indicating the number of the diffraction gratings in a staircase type diffraction grating structure, $\lambda_1$ denotes the wavelength of the first light, and $\lambda_2$ denotes the wavelength of the second light.

Also, the step differences between the diffraction gratings in the staircase type flat plate lens 35 are all same. The step difference creates a phase difference satisfying the following equation (6) with respect to the second light having the wavelength of 790 nm. As a result, there is no phase difference between the second light incident to the area of the numerical aperture of 0.3 or less and the second light incident to the area of the numerical aperture of from 0.3 to 0.5. Accordingly, a spherical aberration is removed.

$$\delta_i = \frac{2\pi i(n-n_0)d_i}{\lambda} \tag{6}$$

Here, $\delta i$ denotes an optical phase difference made by i-th step difference from the optical center of the flat plate lens 35, $\pi$ denotes the ratio of the circumference of a circle to its diameter, and di denotes the depth of the i-th step difference.

Referring back to FIG. 3, the optical recording and pickup head employs the staircase type flat plate lens 35. The staircase type flat plate lens 35 totally transmits the second light incident to the area of the numerical aperture of 0.3 or less, to then be transferred to the objective lens 36, and negatively first order diffracts most of the second light incident to the area of the numerical aperture of from 0.3 to 0.5 toward the optical axis of the objective lens 36, to then be transferred to the objective lens 36. The second light which is focused on and reflected from the information recording surface of the CD-RW 90 by the objective lens 36 transmits the objective lens 36, the staircase type flat plate lens 35, the collimating lens 34 and the beam splitter 33, in turn, to then be incident to the reflective flat plate 32. The reflective flat plate 32 transfers the second light incident from the beam splitter 33 to the light receiving lens 38. The light receiving lens 38 transfers the second light from the reflective flat plate 32 to the photo detector 39. The photo detector 39 detects information from the second light incident from the reflective flat plate 32.

Figure 8:
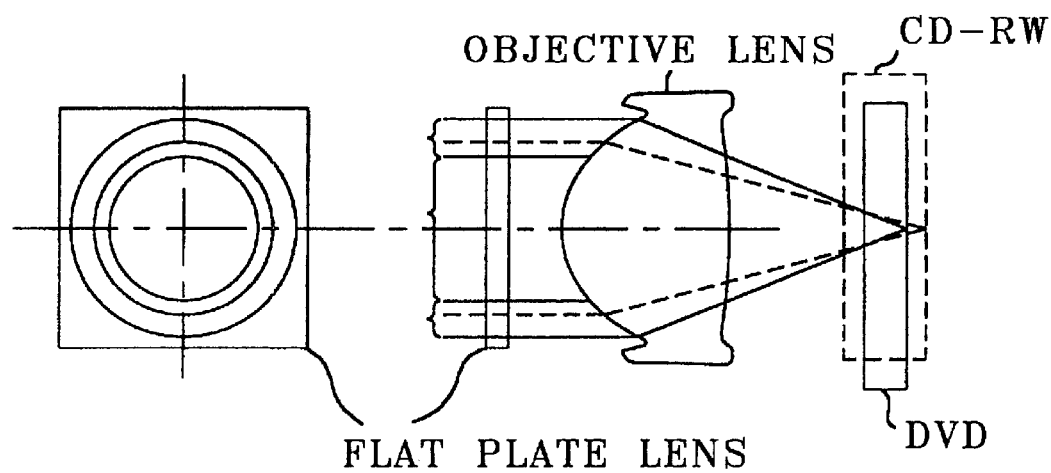
FIG. 8 is a view showing a positional relationship between the staircase type flat plate lens and the objective lens.
Figure 9:
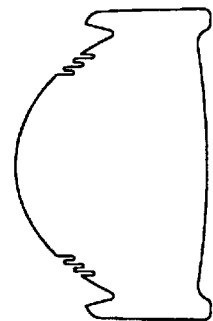
FIG. 9 shows an objective lens integrated with a staircase type flat plate lens.

FIG. 8 is a view showing a positional relationship between the staircase type flat plate lens and the objective lens. FIG. 9 shows an objective lens integrated with a staircase type flat plate lens. As shown, the staircase type flat plate lens can be integrated with an objective lens by forming the diffraction grating structure on any one light receiving plane of the objective lens.

Figure 10:
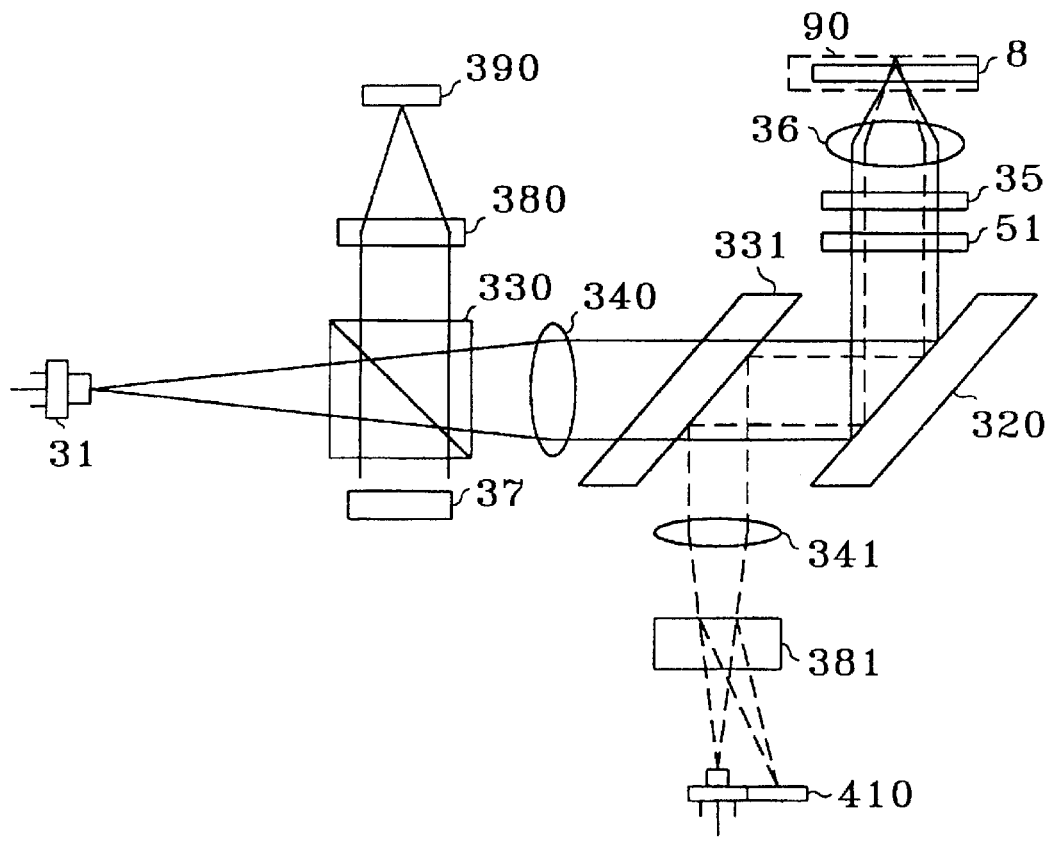
FIG. 10 shows a schematic view of an optical recording and pickup head capable of performing recording and reproduction of information onto a DVD and a CD-RW according to a second embodiment of the present invention.

FIG. 10 shows a schematic view of an optical recording and pickup head capable of performing recording and reproduction of information onto a DVD 8 and a CD-RW 90 according to a second embodiment of the present invention. As shown, a first optical source 31 emits first light of 660 nm to a first beam splitter 330. The first beam splitter 330 transmits most of the first light incident from the first optical source 31 to a first collimating lens 340, and transfers a part of the remaining first light to a photo quantity detector 37. The photo quantity detector 37 detects a photo quantity of the first light incident from the first beam splitter 330. The first collimating lens 340 collimates the light incident from the first beam splitter 330 into parallel light, to then be transferred to a second beam splitter 331. The second beam splitter 331 is an optical element having an optical characteristic of transmitting or reflecting the incident light according to its wavelength, in which the light of 660 nm is totally transmitted and the light of 790 nm is totally reflected. The second beam splitter 331 transfers the light incident from the first beam splitter 330 to a reflective mirror 320. Meanwhile, a second optical source and photo detector 410 emits second light of 790 nm to a second hologram type photo detection lens 381. The second hologram type photo detection lens 381 transfers the second light incident from the second optical source 410 to a second collimating lens 341. The second collimating lens 341 collimates the second light incident from the second hologram type photo detection lens 381 to then be transferred to the second beam splitter 331. The second beam splitter 331 reflects the second light incident from the second collimating lens 341 to then be transferred to the reflective mirror 320. The reflective mirror 320 reflects the first and second light incident from the second beam splitter 331 to a quarter-wave plate 51. The quarter-wave plate 51 changes the polarization direction of the incident light. The first and second light incident to the quarter-wave plate 51 from the reflective mirror 320 passes through a flat plate lens 35, and then is focused on each information recording surface of the optical discs 8 and 90 by an objective lens 36. The first and second light reflected from the optical discs 8 and 90 is incident to the second beam splitter 331 via the objective lens 36, the flat plate lens 35, the quarter-wave plate 51 and the reflective mirror 320. The second beam splitter 331 transmits the first light incident from the reflective mirror 320 toward the first collimating lens 340 and reflects the second light incident from the reflective mirror 320 toward the second collimating lens 341. The first light incident from the first collimating lens 340 to the first beam splitter 330 is transferred to the first hologram type photo detection lens 380 and a first photo detector 390. The first photo detector 390 detects information from the incident first light. Meanwhile, the second light incident from the reflective mirror 320 to the second beam splitter 331 transmits the second collimating lens 341 and the second hologram type photo detection lens 381 to then be incident to a second photo detector 410. The second photo detector 410 detects information from the incident second light. In the optical pickup of FIG. 10, an optical unit comprised of the reflective mirror 320, the quarter-wave plate 51, the flat plate lens 35 and the objective lens 36 is movable, while another optical init comprised of the remaining optical elements except the above optical elements is fixed.

Even though the embodiments of the present invention describe the diffraction grating or diffraction groove of the flat plate lens having a staircase type structure, a diffraction grating or diffraction groove of a flat plate lens having a saw-tooth structure can be employed.

Figure 1:
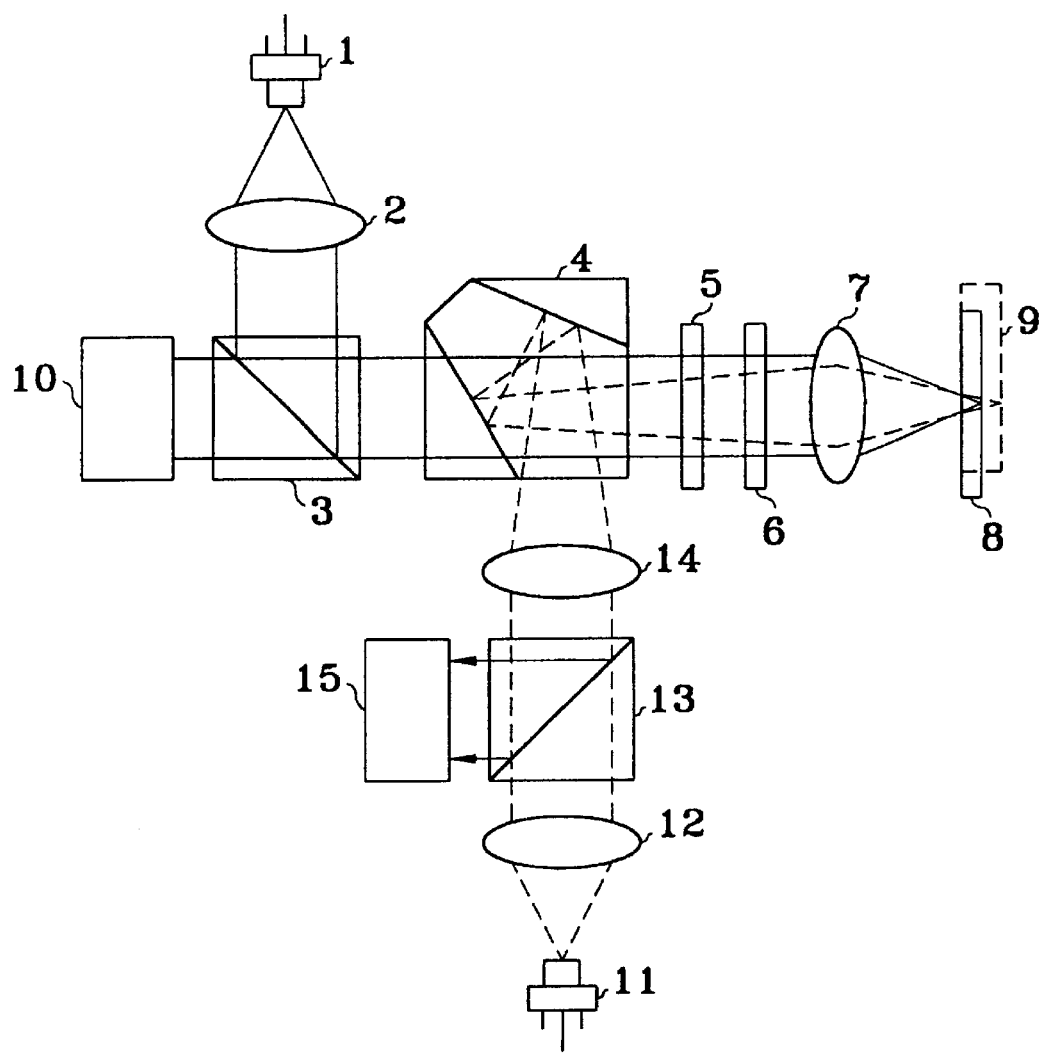
FIG. 1 shows a conventional optical recording and pickup head capable of performing recording and reproduction of information with respect to a DVD and a CD-R.
Figure 2:
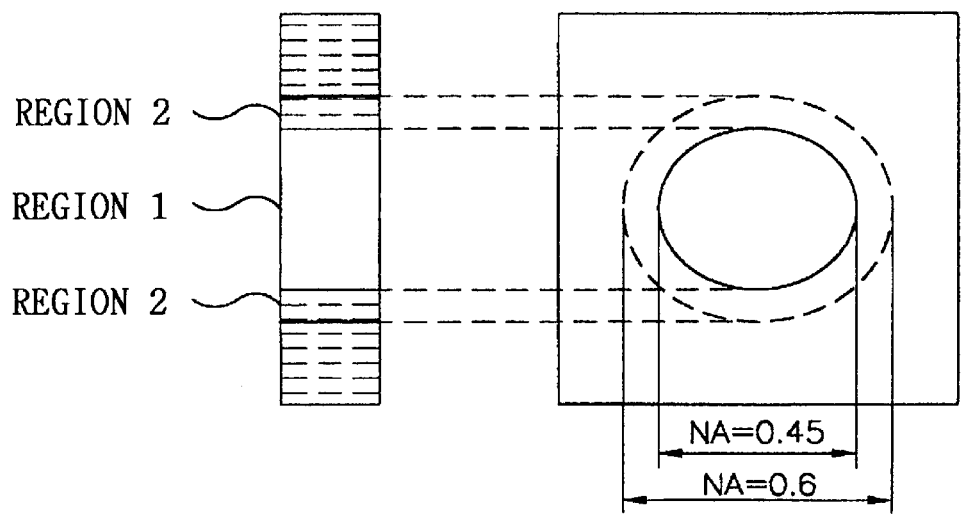
FIG. 2 shows a thin-film type variable aperture of FIG. 1.

As described above, the optical recording and pickup head according to the present invention is compatible with both the DVD 8 and the CD-RW 90. In particular, in the case that information is recorded on and reproduced from the CD-RW 90, the light of 790 nm incident with the numerical aperture of from 0.3 to 0.5 is not totally reflected as in the variable aperture of FIG. 1, and most of the photo quantity is negatively first order diffracted toward the center of the objective lens 36, thereby providing a relatively high optical efficiency.

What is claimed is:

1. An optical recording and and/or pickup head for a plurality of optical discs for performing recording and and/or reproduction of information with respectively different wavelengths, the optical recording and pickup head comprising:

a photo detector;

an objective lens for focusing a first light having a relatively shorter wavelength and a second light having a relatively longer wavelength on the information recording surfaces of optical discs, respectively;

a plate lens having at least two areas wherein both of said at least two areas substantially totally transmit the first light, and wherein one of said at least two areas diffracts the second light toward the optical axis of the objective lens.

2. The optical recording and pickup head according to claim 1, further comprising:

an optical light source for emitting the first and second lights.

3. The optical recording and pickup head according to claim 2, wherein the optical light source comprises:

a first optical light source for emitting the first light; and a second optical light source for emitting the second light.

4. The optical recording and pickup head according to claim 1, wherein said first area comprises an optical center of the light receiving plane and said second area is located at the outside of the first area.

5. The optical recording and pickup head according to claim 4, wherein said second area has an annular shape centered on the optical axis of said flat plate lens.

6. The optical recording and pickup head according to claim 5, wherein said second area comprises diffraction gratings.

7. The optical recording and pickup head according to claim 6, wherein said diffraction gratings are formed facing an optical path altering unit.

8. The optical recording and pickup head according to claim 7, wherein said diffraction gratings are etched shallow as they become farther from the optical center of said flat plate lens.

9. The optical recording and pickup head according to claim 8, wherein said diffraction gratings have a staircase pattern structure which is periodically repeated.

10. The optical recording and pickup head according to claim 9, wherein said diffraction gratings have the same step difference.

11. The optical recording and pickup head according to claim 10, wherein said diffraction gratings are configured in the number satisfying the following equation in a staircase pattern structure of one cycle, $$N=\lambda_1/(\lambda_2-\lambda_1)$$

where N denotes the integer number of the stairs of diffraction gratings, $\lambda_1$ denotes the wavelength of the first light, and $\lambda_2$ denotes the wavelength of the second light.

12. The optical recording and pickup head according to claim 11, wherein said diffraction gratings have transmission efficiency coefficients satisfying the following equation with respect to the second light incident from the optical path altering unit, $$T_m = \frac{1}{T}\int_0^T \exp\left(\frac{2\pi i m}{T}\chi\right)T_j(\chi)d\chi$$

where $T_m$ denotes the transmission efficiency coefficient of m-th diffraction order, T denotes the width of the staircase type diffraction grating structure corresponding to one cycle, m denotes the diffraction order number, π denotes the ratio of the circumference of a circle to its diameter, i denotes the imaginary unit, $\chi$ denotes the distance from the optical center of the flat plate lens, and $T_j(\chi)$ denotes the transmission efficiency coefficient at $\chi$.

13. The optical recording and pickup head according to claim 12, wherein in said staircase type diffraction grating structure of one cycle, each diffraction grating which is located on the j-th position from the optical center of the flat plate lens has a transmission efficiency coefficient $T_j(\chi)$ satisfying the following equation, $$T_j(\chi) = \exp\left(\frac{(2j)\pi i(n - n_0)d}{N\lambda}\right)$$

where $\lambda$ denotes the wavelength of the incident light, d denotes the depth of the diffraction grating which is etched in the deepest in one cycle of the staircase type diffraction grating structure, n denotes the refractive index of the flat plate lens, $n_0$ denotes the refractive index of air, and N is the number of stairs in one cycle grating.

14. The optical recording and pickup head according to claim 13, wherein said diffraction gratings generate phase differences satisfying the following equation, $$\delta_j = \frac{2\pi i(n - n_0)d_j}{\lambda}$$

where $\delta_j$ denotes the optical phase difference generated by the j-th step difference from the optical center of the flat plate lens, $\pi$ denotes the ratio of the circumference of a circle to its diameter, n denotes the refractive index of the flat plate lens, $n_0$ denotes the refractive index of air, and $d_j$ denotes the step difference of the j-th diffraction grating.

15. The optical recording and pickup head according to claim 14, wherein said first area is an area of the numerical aperture of 0.3 or less, and said second area is an area of the numerical aperture of from 0.3 to 0.5.

16. The optical recording and pickup head according to claim 15, wherein said second area has a staircase type diffraction grating structure which is repeated two times, and one of the staircase type diffraction grating structure is formed over the area from about 1000 μm to about 1500 μm in radial direction from the optical center of the flat plate lens and the other is formed over the area from about 1500 μm to about 1700 μm.

17. The optical recording and pickup head according to claim 14, wherein said second area diffracts about 70% or more of the photo quantity of the second light incident from the optical path altering unit toward the optical axis of the objective lens.

18. The optical recording and pickup head according to claim 1, wherein said flat plate lens is integrated with the objective lens.

19. The optical recording and pickup head according to claim 1, wherein said first and second optical discs are a digital versatile disc (DVD) and a read-writable compact disc (CD-RW), respectively, and the first light is used for performing recording and reproduction of information with respect to the first optical disc and the second light is used for performing recording and reproduction of information with respect to the second optical disc.

20. The optical recording and pickup head according to claim 1, wherein said optical path altering unit comprises a collimating lens for collimating the first and second light incident from the first and second optical sources, to then be transferred to the flat plate lens.

21. The optical recording and pickup head according to claim 20, wherein said optical path altering unit further comprises:

a reflective flat plate for transferring the first light emitted from the first optical source to the collimating lens and transferring the first and second light reflected from the information recording surfaces of the optical discs and then returning from the collimating lens, to the photo detector; and a beam splitter for transferring the second light emitted from the second optical source to the collimating lens and transferring the first and second light reflected from the information recording surfaces of the optical discs and then returning from the collimating lens, to the reflective flat plate.

22. In an optical recording and pickup head for a plurality of optical discs a method for performing recording and reproduction of information with respectively different wavelengths, the method comprising:

receiving, by a lens, a first light having a relatively shorter wavelength;

receiving, by the lens, a second light having a relatively longer wavelength;

substantially totally transmitting a portion of the first and second lights that are received in a first area of the lens;

totally transmitting a portion of the first light that are received in a second area of the lens; and diffracting a portion of the second light received in the second area of the lens, wherein the portion is diffracted towards an optical axis of the lens.

* * * * *